United States Patent [19]
Shobert

[11] 3,850,203
[45] Nov. 26, 1974

[54] POROUS TUBE DEVICE FOR BILATERAL OSMOTIC PROCESSES

[76] Inventor: Samuel M. Shobert, 17760 Dragoon Tr., Mishawaka, Ind. 46544

[22] Filed: Dec. 29, 1972

[21] Appl. No.: 319,613

[52] U.S. Cl............. 138/125, 138/140, 210/490
[51] Int. Cl........................ B01d 25/08, F16l 9/12
[58] Field of Search ...... 138/125, 140, 144, DIG. 2; 210/321, 490

[56] References Cited
UNITED STATES PATENTS

| | | |
|---|---|---|
| 2,746,607 | 5/1956 | Hess.................................. 210/490 |
| 3,285,421 | 11/1966 | McKelvey, Jr. et al......... 210/321 X |
| 3,457,170 | 7/1969 | Havens............................... 210/490 |
| 3,504,796 | 4/1970 | Bray................................... 210/321 |
| 3,547,272 | 12/1970 | Shaines et al...................... 210/490 |
| 3,610,420 | 10/1971 | Sampson et al................... 210/490 |
| 3,709,367 | 1/1973 | Martinez............................ 210/321 |

Primary Examiner—Herbert Goldstein

[57] ABSTRACT

An osmotic tube device for use in bilateral osmotic processes has a semipermeable membrane supported between pourous tubes of fiber-reinforced resin. Each of the tubes has one layer of longitudinally extending fibers and a second braided layer.

2 Claims, 3 Drawing Figures

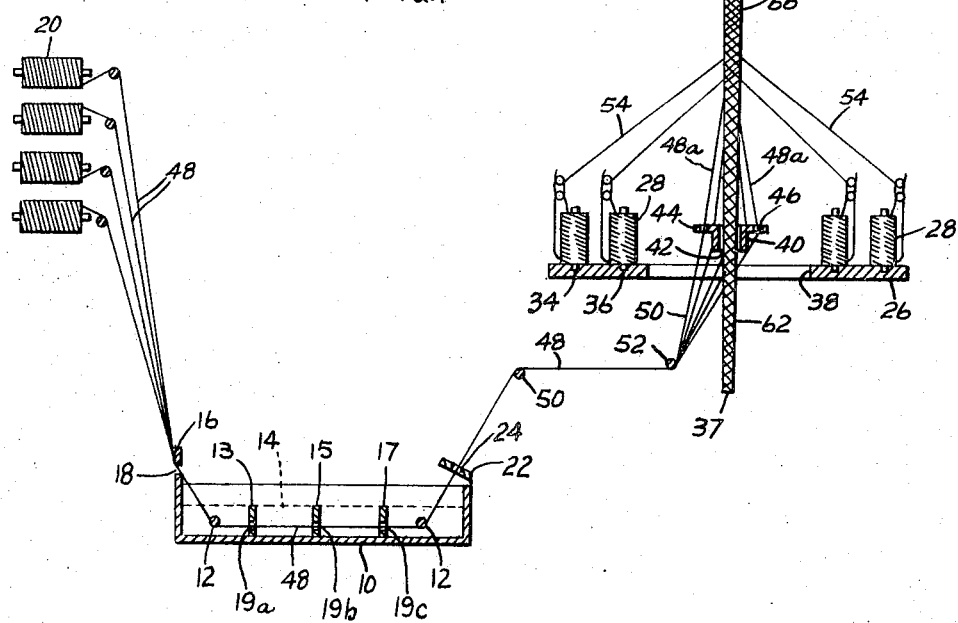

3,850,203

POROUS TUBE DEVICE FOR BILATERAL OSMOTIC PROCESSES

BACKGROUND OF THE INVENTION

1. Field of the Invention

The present invention relates generally to the production of glass-fiber reinforced tubing of controlled porosity for use in various fields including for instance filtration of solids from gases, vapors or liquids, distribution of liquids and inspiration of liquids from supersaturated ground, from filter beds, and in the osmotic separation of fluids.

2. Description of the Prior Art

Glass-fiber reinforced plastic tubes are well known and are used in the construction of fishing rods, golf clubs and the like. One method and apparatus for forming such tubes is disclosed in my prior U.S. Pat. No. 3,033,729 issued May 8, 1962 and U.S. Pat. No. 3,957,962 issued July 29, 1969. Such tubes, however, are not intentionally porous since the necessary strength thereof for their intended purposes could be deleteriously affected if the cured resin components thereof were even minutely discontinuous. It has been known to provide a glass-fiber reinforced plastic tube wherein the porosity is controlled by the arrangement of strands in a braided configuration by the use of chemical blowing agents or diluted liquid plastic. The degree of porosity of tubing of the character here under consideration can be controlled, particularly near the lower end of the range of porosity, much more closely according to the present invention than would be possible in any use prior art techniques.

SUMMARY OF THE INVENTION

According to the present invention, a bundle of glass-fiber strands or roving is arranged peripherally about a suitable mandrel, the lengths of the strands being arranged substantially parallel to the axis of the mandrel, and that tubular bundle is then enshrouded by a braided sheath of other glass-fiber strands, substantially in the manner disclosed in my said prior U.S. Pat. Nos. 3,033,729 and 3,457,962. Substantially all of those strands are wetted and coated with a suitable liquid medium embodying a curable resin, the treatment of the strands with said liquid medium being so controlled that, after curing of the resin so applied to the strands, the cured resin will constitute a discontinuous, foraminous or porous wall, the degree of porosity of the finished tube being predetermined by the character of curable resin applied to the strands. In a preferred form of the invention, the treatment of the strands with the liquid medium is accomplished by drawing the first-mentioned set of strands through a bath of such liquid medium, before arrangement of said strands about the mandrel, whereby those strands are wetted and coated with such medium. As stated in my prior U.S. Pat. Nos. 3,033,729 and 3,457,962 the liquid medium may be generally of the character of that disclosed in the Francis U.S. Pat. No. 2,602,766, issued July 8, 1952, or in Meek U.S. Pat. No. 2,684,318, issued July 20, 1954. Control of the degree of porosity of the finished tube, however, is accomplished by controlling the amount of resin in the strands before arrangement about the mandrel.

Porous tubing may be used in connection with the filtration of solids from gases, vapors, or liquids or for irrigation purposes. In accordance with this invention, this porous tubing may also be used in a tubular structure for the osmotic separation of fluid in which a semi-permeable osmotic tubular membrane is laminated between two porous tubes made according to this invention, such tubes being of sufficient rigidity and strength not only to support the membrane but also to withstand the pressure of liquid solutions being separated.

OBJECTS OF THE INVENTION

It is an object of the present invention therefore to provide a fiber-reinforced plastic tube having a porous wall, the porosity of the wall being controlled by the amount of liquid resin solution used in impregnating the fibers.

Another object of the present invention is to provide a method for fabricating glass-fiber reinforced plastic filters of elongated, hollow configuration by controlling in a predetermined manner the quantities of glass-fiber and curable liquid resin used as well as the constituency of the resin.

Still another object of this invention is to provide an osmotic tube device in which a tubular osmotic membrane is laminated between two fiber reinforced porous tubes having sufficient strength and rigidity to withstand the usual pressures involved in the osmotic separation of the solutions.

Still another object of this invention is to provide a method for fabricating an osmotic tube device in which a tubular osmotic membrane is laminated between two porous tubes of glass-fiber reinforced plastic.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side view in diagrammatic form of an apparatus used in the fabrication of a porous tube device of this invention;

FIG. 2 is a perspective view of a tubular structure of this invention used in the osmotic separation of liquids; and FIG. 3 is a cross-sectional view thereof.

Referring to the drawings, and more particularly to FIG. 1 the apparatus disclosed is like that of my U.S. Pat. No. 3,357,962 and comprises a tank or vessel 10 within which is mounted a plurality of horizontal bars or rollers 12 which are submerged in liquid heat-hardenable polyester or epoxy resin. For one embodiment of this invention, polyester is preferred at a viscosity of about 500 centipoise. The level of such liquid materials is indicated by the numeral 14. Situated toward the left of the rollers 12 as viewed in FIG. 1 is an upstanding extension 16 on the tank 10 having a plurality of horizontally spaced guiding apertures 18. These apertures preferably extend for the width of the tank 10.

Secured to the tank 10 and submerged in the liquid resin are at least three parallel, straight metal bars or strips 13, 15 and 17 spaced apart substantially equally between the rollers 12. Each strip 13, 15, 17 contains a plurality of small openings 19a, 19b and 19c, respectively, arranged transversely of the tank 10 and submerged in resin. In one working embodiment of this invention, each strip 13, 15, 17 contains twenty-four such openings spaced equally apart.

Moving from left to right as viewed in FIG. 1, the openings 19a, 19b and 19c progressively decrease in size as explained more fully later on.

To the left of the tank 10 is disposed a creel or frame (not shown) on which is mounted a plurality of spools 20 of glass thread or strand commonly referred to as strand roving. This strand can be the same as that disclosed in U.S. Pat. Nos. 2,684,318, 3,957,962 and 2,602,766, the resin or plastic material used can also be the same as that disclosed in these patents.

As used hereafter, the term "thread" or "strand" is intended to include, but not to be limited to a roving or yarn composed of a number of "ends," each "end" having 204 glass filaments or fibers. More or less filaments within reason may be used without departing from the scope or spirit of this invention. Desirably, these filaments are bundled together to form a continuous length of strand and are not twisted together except to the minimum extent required to maintain the continuity in the strand length. More detailed specifications for particular embodiments of this invention are given hereinafter.

Fixedly secured with respect to the tank 10, adjacent to the right-hand end thereof is a horizontal stripping bar 22 having a series of horizontally spaced apertures 24 therein. These apertures 24 are of critical size and determine the amount of resin retained by the strands which pass therethrough. This will be explained in more detail later on.

Again viewing FIG. 1, the openings 19a, 19b, 19c and 24 in a direction from left to right progressively decrease in size, the openings 24 being the smallest. In one operating embodiment of this invention these openings 24 are circular and 0.045 – 0.055 inch in diameter. All of these openings 19a, 19b, 19c and 24 are in straight alignment longitudinally of the tank 10.

A conventional braiding machine carries on its supporting table 26 a suitable number (6, 12 or more) of spools 28 of glass strand. An elongated, cylindrical mandrel 37 coaxially passes through a clearance opening 38 in the center of the supporting table 26. An operator can hold the mandrel 37 in position and operate it in the manner as will be explained later. The table 26 is disposed horizontally and the mandrel 37 vertically coaxially thereof.

Fixedly mounted against movement on suitable supporting structure not shown is a strand-distributing or grouping ring 40 having a central opening 42 through which the mandrel 37 may coaxially pass freely. A right angle annular flange 44 on the ring 40 is provided with a plurality of equally circumferentially spaced distributing apertures 46, these apertures being coaxially arranged with respect to the mandrel 37.

Glass strand, indicated generally by the reference numeral 48 is payed off the several supply spools 20 and threaded through the respective apertures 18. These strands 48 are further passed beneath the first roller 12 which may be journaled in the sides of the tank 10 if desired, and from there are passed in straight lines through respective successive apertures 19a, 19b, 19c, then under the second roller 12 upwardly through the individual, respective apertures 24 over a second bar or roller 50 situated above the bar 22. One aperture 19a, 19b, 19c and 24 is provided for each strand 48, so that the latter follows a substantially straight line between the two rollers 12. From the bar 50, the strands are further passed beneath another guiding bar or roller 52 situated almost directly beneath the distributing ring 40. From here, the strands 48 are passed upwardly through the respective apertures 46, there being one aperture for each thread.

As the threads 48 are drawn through the tank 10, they will be wetted by the resin therein.

The openings 19a, 19b and 19c may be regarded as collecting and sizing dies or bushings for the individual strands 49 passing therethrough. As each strand 48 initially enters the bath 14 and passes beneath the first roller 12, it flattens against the latter. The resin flows between and wets the individual filaments or fibers thereof. As the strand progresses to and through the opening 19a, it is grouped into a circular shape, thereby further subjecting it to impregnation by the resin. Further advancement through the remaining openings 19b and 19c compacts the strand into a still smaller size, squeezing and working the filaments such that entrapped or occluded air is eliminated. Levitating air bubbles in the resin adjacent to strip 17 evidences such elimination of air.

Strands 54 from the individual spool 28 are individually affixed to the mandrel 37 by some suitable means such as tying, thereby placing the apparatus in condition for operation.

An important feature resides in the tensioning of the strands 54 at the time the strands are applied to the mandrel 37. This is fully disclosed in U.S. Pat. No. 3,457,962.

In operation the mandrel 37 is lowered in the distributing ring 48 to a position at which the upper end 64 of the mandrel is adjacent to the upper side of the ring 40. The free ends of the strands 48 which have been passed through the apertures 46 are now attached securely to the upper end 64 of the mandrel. The mandrel is axially raised slightly without rotation so as to apply tension to all of the strands 48 which now extend longitudinally of the mandrel 37, at which time the strands are equally spaced apart and lie in vertical planes. It should be remembered that these individual strands 48 are wet with resin from the tank 10. Also, the apertures 46 are close to the mandrel as will become apparent from the descriptions that follow.

The strands 54 from the spools 28 are tied to the top end 64 of the mandrel 37 over the strands 48. These longitudinally extending strands are denoted by the numeral 48a. At this point, the braider is operated so as to apply a layer of braid over the longitudinally extending strands 48a while the mandrel 37 is raised at a uniform rate. The layer of braid is indicated by the numeral 56. The holes 46 are of larger size than the apertures 24 and made large enough to pass the individual threads 48 without wiping therefrom any more resin than is desired and the strands 48a are contiguously evenly distributed around the circumference of the mandrel, which provides a uniform radial thickness in the finished tube, as will become apparent from the description that follows.

The strands forming the second layer 66 of braid over the strands 48a are tensioned, such that the strands 48a are frictionally and firmly clamped or gripped onto the first layer 62.

After the full length of the mandrel 37 has been moved upwardly through the distributing ring 40, for example, such mandrel may have a length of 4 or 5 feet, the braiding and pulling operations are stopped and the strands on the lower end of the mandrel are tied with a cord as before. All of the strands applied to the mandrel are tied at the ends of the latter so as to maintain the strands in tension.

As the braid layer 56 is being applied, the liquid resin in the strands 48a is squeezed from the latter and exudes or flows into the fibers and strands of braid 56. By this means, all of the strands of both layers are impregnated.

As will now be apparent, the number and sizes of the strands 48 and 54 and the amount of resin carried by the strands 48 will determine the degree of the impregnation.

The apertures 24 in the stripping bar 22 are of critical size and serve in determining the quantity of resin retained in the strands 48a. For the specific examples given hereinbefore and hereafter, a glass-to-resin ratio of about eight to one, for each strand emerging from an aperture 24 has been found to provide a degree of porosity desired. In other words, the volume of each wetted strand 48 as it emerges from its aperture 24 is taken as 100 percent and of this 10 to 25 percent is resin and the balance is glass.

The mandrel assemblage is next inserted into a curing oven, where it is heated until the resin has completely cured or hardened. Following this, the mandrel 37 is removed, leaving a hollow tube.

For one embodiment, this hollow tube as just described may be considered as consisting of the two layers 56, 62 (FIG. 3) which is made of a sufficient quantity of material to be self-supporting, relatively rigid and strong. By controlling the quantity of resin in the strands 48 that emanate from the die apertures 24, this hollow tube 56, 62 may be given a particular degree of porosity. In the control of this porosity, if the liquid resin applied to the strands 48 is excessive as compared to the quantity of glass fiber therein, a continuous film or wall will result rendering the resultant tube impervious. However, by reducing resin-to-glass ratio to a predetermined figure, the tube wall may be rendered permeable, the degree of permeability depending upon the precise resin-to-glass ratio. By selection of suitably small sizes for the die apertures 24, a controlled degree of impregnation of the glass fiber applied to the mandrel 37 may be obtained, and if the impregnation is insufficient to produce the continuous film, the tube wall will have a series of minute, random passages therethrough evidenced as porosity in the tube wall. By altering the size of the die apertures 24, the degree of porosity may be thus controlled, the smaller the resin-to-glass ratio providing a greater degree of porosity.

Tubing made according to this method is substantially of uniform wall thickness throughout its extent and possesses considerable flexural and torsional strength. Additionally, the tubing has excellent bursting strength whereby it may be used in high pressure hydraulic systems. The braided and longitudinal strands form two tubular laminations substantially of uniform composition and dimension, thereby contributing to uniform physical characteristics in the finished product. The resulting structure is quite rigid and strong, and can be made to any suitable length desired, depending upon the length of the mandrel 37.

Tubing made according to this invention may be used for the purpose of filtering air. If used as an air filter, the tubing can serve as its own support, not requiring rigid, protective shells or casings as is true of other known filters. In some instances, it is desirable to treat liquids by injecting gas thereinto. Tubing made according to this invention can be used for this purpose, the degree of porosity and the size of the pores determining the quantity and size of the bubbles in the liquid.

For a given tubular structure 56, 62 made according to the method described herein and above, the tubing having 0.5 inch inner-diameter and five-eighths inch wall thickness, the fill layer 62 has 24 strands of rovings 48, each strand being composed of 60 ends and each end being composed of 204 basic fibers of glass. For the braided layer 56, 24 strands or rovings 54 are used, each of these being composed of five or six ends of 204 glass fibers each. Each braided layer has 12 strands encircling helically in one direction and a like number in the opposite direction. The die aperture 24 has a diameter of from 0.045 to 0.055 inch.

A further embodiment of this invention relates to solvent separation by reverse osmosis which in particular is useful in effecting desalination of saline water.

It is known in the separation of a solvent from a solution by means of reverse osmosis to use a semipermeable osmotic membrane suitably supported by a porous supporting structure as disclosed in U.S. Pat. No. 3,457,170. Representative osmotic membranes are disclosed in this prior patent. Any substantially monomolecular polymeric film of controlled permeability may be suitable. Specific films include, but are not limited to films of cellulose acetate, cellulose triacetate, cellulose propionate polyvinyl alcohol, cellulose acetate-butyrate, ethyl cellulose, methyl methacrylate, etc. Membranes may be deposited or coated on a porous tubular support member, like the tube 56, 62 of FIG. 3, to provide a unitary structure therewith. For example, a film of a modified cellulose solution can be deposited or coated directly on the surface of the porous tube 56, 62 preferably to a uniform thickness. Film thicknesses of about 0.003 to 0.004 inch thick have optimum desired solvent separation characteristics. Suitable membrane compositions and techniques for applying the compositions to the porous tube 56, 62 are disclosed in the aforesaid U.S. Pat. No. 3,457,170.

Referring to FIG. 3, such an osmotic membrane 70 is indicated as covering intimately the periphery of the braid layer 56 of the tube 56, 62. According to one method, this membrane 70 is applied in liquid state to the tube 56, 62 which has been previously cured or dried. In the alternative, certain of the liquid or plastic membrane material may be applied to the surface of the braid layer 56 prior to curing of the resin such that both materials cure and dry simultaneously.

Once the membrane 70 has been applied and is cured or dried, the second porous tube structure 58, 60 like the structure 62, 56 is formed over the membrane 70. This is accomplished without withdrawing the mandrel 37 from the first formed tube, the membrane 70 being applied to the outer surface thereof following which the second tube 58, 60 is applied thereto. This outer tube 58, 60 is composed of longitudinally extending strands 58 like those of the layers 62 and a braid layer 60 like the layer 56. The outer tube may be applied either before or after the inner tube and membrane have been cured.

The composite is then cured and the mandrel removed thereby leaving a tubular structure as shown in FIGS. 2 and 3 in which the tubular osmotic membrane 70 is laminated or sandwiched between the two coaxial porous tubes 56, 62 and 58, 60. The tube 58, 60 is indicated in FIG. 2 by the numeral 72, the membrane by the numeral 74 and the inner tube 56, 62 by the numeral 76.

In one design, the inner tube 76 is made more porous than the outer tube whereby back flushing of precipitants that collect on the membrane 70 may be performed. In the prior art, especially as evidenced by the aforesaid U.S. Pat. No. 3,467,170 an osmotic membrane is secured to the inner or outer peripheral surface of a porous supporting tube. Thus, the application of fluid pressure must always be on the side of the membrane in order to prevent separation from the tubular support. By reason of the present invention, inasmuch as the membrane is sandwiched between two supporting tubes 72 and 76, fluid pressure may be applied to the inner or outer surface of the tubular structure without rupturing or in any way causing separation of the membrane 70. Bilateral application of pressure fluid as contrasted with unilateral application of the Prior Art is thus afforded by this invention.

In the fabrication of the osmotic tube, it is possible according to the teachings of this invention to control precisely the degree of porosity in the two supporting tubes 72 and 76 and furthermore to fabricate efficiently and efficaciously a total structure in a logical sequence of operations.

While there have been described above the principles of this invention in connection with specific apparatus, it is to be clearly understood that this description is made only by way of example and not as a limitation to the scope of the invention.

What is claimed is:

1. An osmotic tube device for use in separating fluids by osmosis comprising a first self-supporting tubular lamination of fiber-reinforced resin having a multiplicity of passages extending through the wall thereof, a semipermeable osmotic membrane on the exterior of said first lamination in intimate engagement therewith, and a second self-supporting tubular lamination of fiber-reinforced resin having a multiplicity of passages through the wall thereof on the exterior of said membrane and in intimate engagement therewith, said first and second laminations being of such strength and rigidity to support said membrane under the conditions of bilateral osmosis, said passages providing paths for solvent passing through said membrane, said first and second laminations each comprising at least two contiguous layers of glass-fiber reinforcement, said layers being embedded within and bonded to each other by cured resinous material, said material being discontinuous and having voids therein thereby providing said passages in said layers between glass fibers, one of said layers including a plurality of longitudinally extending substantially straight circumferentially adjacent strands of glass fibers, the other of said layers including strands of glass fibers extending in the form of a first helix in one circumferential direction and a second helix in the opposite circumferential direction, and said other layer surrounding said one layers, said other layer being a braided seamless tube with the strands thereof contiguous.

2. The tube device of claim 1 in which said resinous material is either polyester or epoxy.

* * * * *